United States Patent
Zhang et al.

(10) Patent No.: US 8,149,767 B2
(45) Date of Patent: Apr. 3, 2012

(54) METHODS OF ASSIGNING RESOURCES FOR THE UPLINK CONTROL CHANNEL IN LTE

(75) Inventors: Jianzhong Zhang, Irving, TX (US); Joonyoung Cho, Kyeonggi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 773 days.

(21) Appl. No.: 12/314,384

(22) Filed: Dec. 9, 2008

(65) Prior Publication Data

US 2009/0232065 A1    Sep. 17, 2009

Related U.S. Application Data

(60) Provisional application No. 61/064,590, filed on Mar. 13, 2008.

(51) Int. Cl.
*H04W 4/00* (2009.01)
(52) U.S. Cl. ........ 370/328; 370/208; 370/281; 370/295; 370/310.2; 370/319; 370/338; 370/343; 370/349; 370/480; 455/59; 455/60; 455/112; 455/260; 455/422.1
(58) Field of Classification Search ............... 370/208, 370/281, 295, 310.2, 319, 328, 338, 343, 370/349, 480; 455/59, 60, 112, 260, 422.1
See application file for complete search history.

(56) References Cited

U.S. PATENT DOCUMENTS

| 2008/0310540 A1* | 12/2008 | Tiirola et al. | 375/267 |
| 2009/0175159 A1* | 7/2009 | Bertrand et al. | 370/203 |
| 2009/0196229 A1* | 8/2009 | Shen et al. | 370/328 |
| 2009/0231993 A1* | 9/2009 | Zhang et al. | 370/210 |
| 2009/0232067 A1* | 9/2009 | Pajukoski et al. | 370/329 |
| 2009/0303978 A1* | 12/2009 | Pajukoski et al. | 370/345 |

OTHER PUBLICATIONS

Ericsson, R1-081155: Update of uplink reference-signal hopping, downlink reference signals, scrambling sequences, DwPTS/UpPTS lengths for TDD and control channel processing, Feb. 28, 2008, 3GPP.*

Ericsson, R1-081161: Update of uplink reference-signal hopping, downlink reference signals, scrambling sequences, DwPTS/UpPTS lengths for TDD and control channel processing, Mar. 4, 2008, 3GPP.*

* cited by examiner

*Primary Examiner* — Aung S Moe
*Assistant Examiner* — Hoon J Chung (57) ABSTRACT

A method of a slot-level remapping physical uplink control channels into two resource blocks respectively located at two slots of a subframe, is generally adapted to a complex 3GPP LTE physical uplink where ACK/NAK recourse blocks may be applied by the extended cyclic prefix, mixed resource blocks (where the ACK/NAK and CQI channels coexist) may be applied by the normal cyclic prefix, or mixed recourse blocks (where the ACK/NAK and CQI channels coexist) may be applied by the extended cyclic prefix.

16 Claims, 4 Drawing Sheets

Figure 4

METHODS OF ASSIGNING RESOURCES FOR THE UPLINK CONTROL CHANNEL IN LTE

CLAIM OF PRIORITY

This application makes reference to, incorporates the same herein, and claims all benefits accruing under 35 U.S.C.§119 from an application earlier filed in the U.S. Patent & Trademark Office on 13 Mar. 2008 and there duly assigned Ser. No. 61/064,590.

BACKGROUND OF THE INVENTION

1. Field of the Invention

The present invention relates to a method and a circuit for physical uplink transmission for 3GPP long term evolution (LTE), and more specifically, to a method and a circuit generally adept at remapping physical uplink control channels for both of a resource block containing acknowledgement and non-acknowledgement (ACK/NAK) channels and a mixed resource block containing the ACK/NAK channels and channel quality indication (CQI) channels.

2. Description of the Related Art

Orthogonal Frequency Division Multiplexing (OFDM) is a popular wireless communication technology for multiplexing data in the frequency domain.

The total bandwidth in an Orthogonal frequency-division multiplexing (OFDM) system is divided into narrowband frequency units called subcarriers. The number of subcarriers is equal to the FFT/IFFT size N used in the system. Generally, the number of subcarriers used for data transmission is less than N because some of the subcarriers at the edge of the frequency spectrum are reserved as guard subcarriers, and generally no information is transmitted on these guard subcarriers.

The Third Generation Partnership Project Long Term evolution (3GPP LTE) is a project within the Third Generation Partnership Project to improve the Universal Mobile Telecommunications System mobile phone standard to cope with future requirements. In the standards of the physical uplink of 3GPP LTE (long term evolution), one type of the resources used for transmitting the uplink control channel (PUCCH) is known as a cyclic shift (CS) for each OFDM symbol. One of important aspects of the system design is resource remapping on either a symbol, slot or subframe-level.

The following three references are cited as being exemplary of contemporary practice in the art:

Reference [1], R1-081155, "CR to 3GPP spec 36.211 Version 8.1.0", RAN1#52, February 2008, Sorrento, Italy, describes the standards of the physical channels for 3GPP, and chapter 5.4.1 will be cited in the following specification in order to illustrate the contemporary slot-level remapping method for the acknowledgement and non-acknowledgement (ACK/NAK) channel in the physical uplink of 3GPP LTE system.

Reference [2], R1-080983, "Way-forward on Cyclic Shift Hopping Pattern for PUCC", Panasonic, Samsung, ETRI, RAN1#52, February 2008, Sorrento, Italy, discloses methods for remapping either a resource block containing only ACK/NAK channel or a resource block containing both CQI and ACK/NAK channels.

Reference [3], R1-073564, "Selection of Orthogonal Cover and Cyclic Shift for High Speed UL ACK Channels", Samsung, RAN1#50, August 2007, Athens, Greece, teaches a scenario for data transmission for high speed uplink ACL/NAK channel by using a subset of the combination of the cyclic shift and the orthogonal cover.

The methods of the slot-level resource remapping recently proposed, for example as disclosed in references [2] and [3], have been included in the 3GPP standards as shown in reference [1]. One of the shortages of transmission capacity in wireless telecommunication networks is that the contemporary remapping methods for resource blocks containing control channels are designed exclusively for either ACK/NAK resource blocks with the extended cyclic prefix or for normal cyclic prefix cases where a mixed resource block containing both of the ACK/NAK and CQI channels, but contemporary remapping methods are not applicable for both. This shortage in transmission capacity prevents the contemporary techniques from being readily adapted to a complex 3GPP LTE physical uplink where ACK/NAK resource blocks may be applied by the extended cyclic prefix, adapted to a complex 3GPP LTE physical uplink where mixed resource blocks (where the ACK/NAK and CQI channels coexist) may be applied by the normal cyclic prefix, and adapted to a complex 3GPP LTE physical uplink where mixed resource blocks (where the ACK/NAK and CQI channels coexist) may be applied by the extended cyclic prefix.

SUMMARY OF THE INVENTION

It is therefore an object of the present invention to provide an improved method and an improved circuit for conducting physical uplink transmission in order to overcome the above shortage which prevents the contemporary techniques from being generally adapted to a complex 3GPP LTE physical uplink.

It is another object of the present invention to provide a method and a circuit, with an intra-cell randomization, generally compatible with a complex 3GPP LTE physical uplink where ACK/NAK recourse blocks may be applied by the extended cyclic prefix, mixed recourse blocks (where the ACK/NAK and CQI channels coexist) may be applied by the normal cyclic prefix, or mixed recourse blocks (where the ACK/NAK and CQI channels coexist) may be applied by the extended cyclic prefix.

In the first embodiment of the present invention, a method for a physical uplink transmission, contemplates allocating a cyclic shift and an orthogonal cover to physical uplink control channels; remapping, in a slot-level, the physical uplink control channels into two resource blocks respectively located at two slots of a subframe, with:

when $n_s$ mod $2=0$, resource indices of the physical uplink control channels within a first slot of the two slots in the two slots of the subframe are established by:

$$n'(n_s) = \begin{cases} n_{PUCCH}^{(1)} & \text{if } n_{PUCCH}^{(1)} < c \cdot N_{cs}^{(1)} / \Delta_{shift}^{PUCCH} \\ (n_{PUCCH}^{(1)} - c \cdot N_{cs}^{(1)} / \Delta_{shift}^{PUCCH}) \bmod(c \cdot N_{sc}^{RB} / \Delta_{shift}^{PUCCH}) & \text{otherwise,} \end{cases}$$

where $n_s$ is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta_{shift}^{PUCCH} \in \begin{cases} \{[1], 2, 3\} & \text{for a normal cyclic prefix} \\ \{2, 3\} & \text{for an extended cyclic prefix} \end{cases}, \text{ and}$$

-continued $$c = \begin{cases} 3 & \text{for the normal cyclic prefix} \\ 2 & \text{for the extended cyclic prefix} \end{cases}; \text{and}$$

when $n_s \mod 2=1$, the resource indices of the physical uplink control channels within a second slot of the two slots of the subframe to which the physical uplink channel symbols are remapped by:

$$n'(n_s) = f(n'(n_s - 1)) = \begin{cases} [3(n'(n_s - 1) + 1)] \mod (3N_{sc}^{RB}/\Delta_{shift}^{PUCCH} + 1) - 1 & \text{for normal cyclic prefix and } n_{PUCCH}^{(1)} \geq c \cdot N_{cs}^{(1)}/\Delta_{shift}^{PUCCH} \\ \lfloor h(n'(n_s - 1))/c \rfloor + [h(n'(n_s - 1)) \mod c] \cdot (N'/\Delta_{shift}^{PUCCH}) & \text{otherwise} \end{cases}$$

where $$h(n'(n_s - 1)) = \begin{cases} [2n'(n_s - 1)] \mod \left(2\left\lfloor\frac{d}{2}\right\rfloor + 1\right) + d \cdot \left\lfloor\frac{n'(n_s - 1)}{d}\right\rfloor \cdot (d \mod 2) & \text{for normal cyclic prefix} \\ n'(n_s - 1) & \text{for extended cyclic prefix,} \end{cases}$$

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}, \text{ and } d = cN_{cs}^{(1)}/\Delta_{shift}^{PUCCH} - 1;$$

and transmitting the remapped physical uplink control channels in the physical uplink.

In the second embodiment of the present invention, a method for a physical uplink transmission, contemplates allocating a cyclic shift and an orthogonal cover to physical uplink control channels; remapping in a slot-level, the physical uplink control channels into two resource blocks respectively located at two slots of a subframe, with:

when $n_s \mod 2=0$, resource indices of the physical uplink control channels within a first slot of the two slots in the two slots of the subframe are established by:

$$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \mod (c \cdot N_{sc}^{RB}/\Delta_{shift}^{PUCCH}) & \text{otherwise,} \end{cases}$$

where $n_s$ is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta_{shift}^{PUCCH} \in \begin{cases} \{[1], 2, 3\} & \text{for a normal cyclic prefix} \\ \{2, 3\} & \text{for an extended cyclic prefix} \end{cases}, \text{and}$$

$$c = \begin{cases} 3 & \text{for the normal cyclic prefix} \\ 2 & \text{for the extended cyclic prefix} \end{cases}; \text{and}$$

when $n_s \mod 2=1$, the resource indices of the physical uplink control channels within a second slot of the two slots of the subframe to which the physical uplink channel symbols are remapped by:

$$n'(n_s) = f(n'(n_s - 1)) = \lfloor h(n'(n_s - 1))/c \rfloor + [h(n'(n_s - 1)) \mod c] \cdot (N'/\Delta_{shift}^{PUCCH}),$$

where $$h(n'(n_s - 1)) = \begin{cases} [2n'(n_s - 1)] \mod \left(2\left\lfloor\frac{d}{2}\right\rfloor + 1\right) + d \cdot \left\lfloor\frac{n'(n_s - 1)}{d}\right\rfloor \cdot (d \mod 2) & \text{for normal cyclic prefix} \\ n'(n_s - 1) & \text{for extended cyclic prefix,} \end{cases}$$

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}, \text{ and } d = cN_{cs}^{(1)}/\Delta_{shift}^{PUCCH} - 1;$$

and transmitting the remapped physical uplink control channels in the physical uplink.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
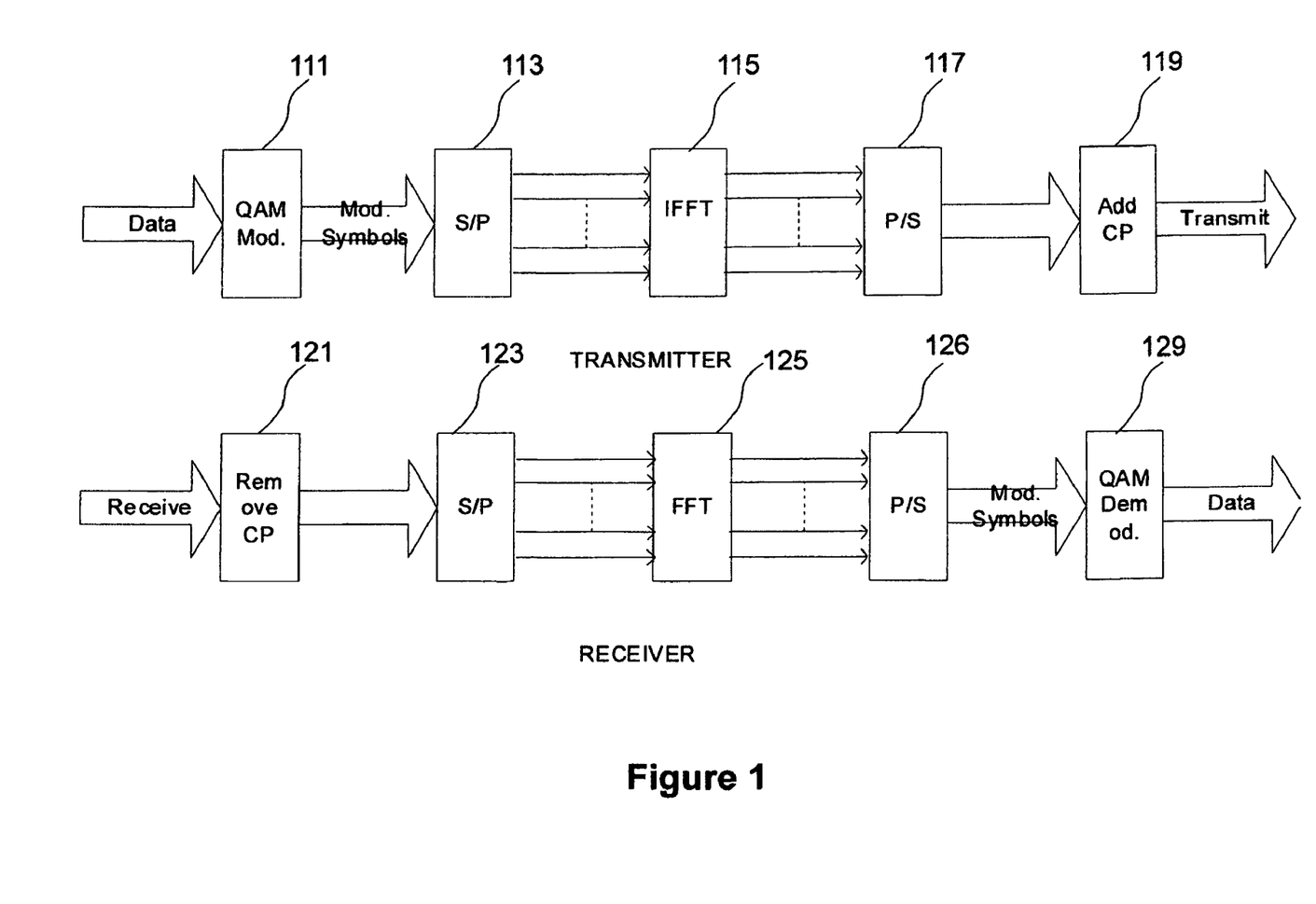
FIG. 1 is a block diagram of a simplified example of data transmission and reception using Orthogonal Frequency Division Multiplexing (OFDM)

A simplified example of data transmission/reception using Orthogonal Frequency Division Multiplexing (OFDM) is shown in FIG. 1.

At the transmitter, the input data to be transmitted is modulated by a quadrature amplitude modulation (QAM) modulator 111. The QAM modulation symbols are serial-to-parallel converted by a serial-to-parallel convertor 113 and input to an inverse fast Fourier transform (IFFT) unit 115. At the output of IFFT unit 115, N time-domain samples are obtained. Here N refers to the sampling number of IFFT/FFT used by the OFDM system. The signal transmitted from IFFT unit 115 is parallel-to-serial converted by a parallel-to-serial convertor 117 and a cyclic prefix (CP) 119 is added to the signal sequence. The resulting sequence of samples is referred to as the OFDM symbol. Serial to parallel convertor 113 uses shift registers to convert data from serial form to parallel form. Data is loaded into the shift registers in a serial load mode, and is then shifted parallel in a shift mode with a clock signal.

At the receiver, the cyclic prefix is firstly removed at cyclic prefix remover 121 and the signal is serial-to-parallel converted by parallel-to-serial convertor 123 before feeding the converted parallel signal into fast Fourier transform (FFT) transformer 125. Output of FFT transformer 125 is parallel-to-serial converted by parallel-to-serial convertor 128 and the resulting symbols are input to QAM demodulator 129. Parallel to serial convertor 123 uses shift registers to convert data from parallel form to serial form. Data is loaded into the shift registers in a parallel load mode, and is then shifted serially in a shift mode with a clock signal.

The total bandwidth in an OFDM system is divided into narrowband frequency units called subcarriers. The number of subcarriers is equal to the FFT/IFFT size N. In general, the number of subcarriers used for data is less than N because some of the subcarriers at the edge of the frequency spectrum are reserved as guard subcarriers, and no information is transmitted on guard subcarriers.

In the uplink of 3GPP LTE standards, one type of the resource used in the uplink control channel (PUCCH) is known as a cyclic shift (CS) for each OFDM symbol. PUCCH includes control information, e.g., channel quality indication (CQI), ACK/NACK, hybrid automatic repeat requests (HARQ) and uplink scheduling requests.

Figure 2:
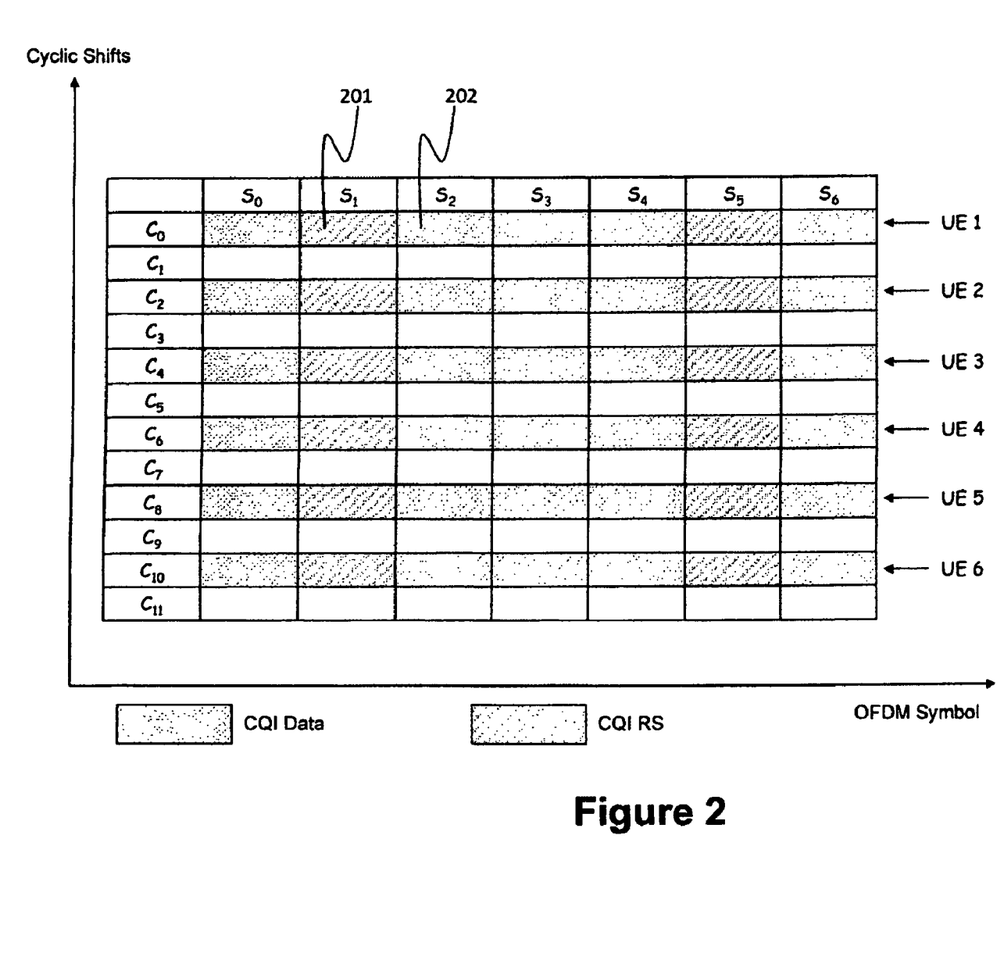
FIG. 2 is an illustration showing an example of multiplexing six user equipments into one resource block channel quality indication signals within one slot.

FIG. 2 is an illustration showing an example of multiplexing six user equipments (UEs) into one resource block containing channel quality indication (CQI) signals within one slot. In FIG. 2, the PUCCH occupies twelve subcarriers in the resource block and twelve cyclic shift resources ($c_0$ through $c_{12}$) exist in the resource block. The CQI signals include both of CQI data signals (e.g., CQI data signal 201) occupying several symbol elements (e.g., $s_0$) within the OFDM symbols and CQI reference signals (e.g., CQI reference signal 202) occupying several symbol elements (e.g., $s_1$). Six UEs (i.e., UE 1 through UE 6) are multiplexed in the resource block. Here, only six out of twelve cyclic shifts are actually used.

Figure 3:
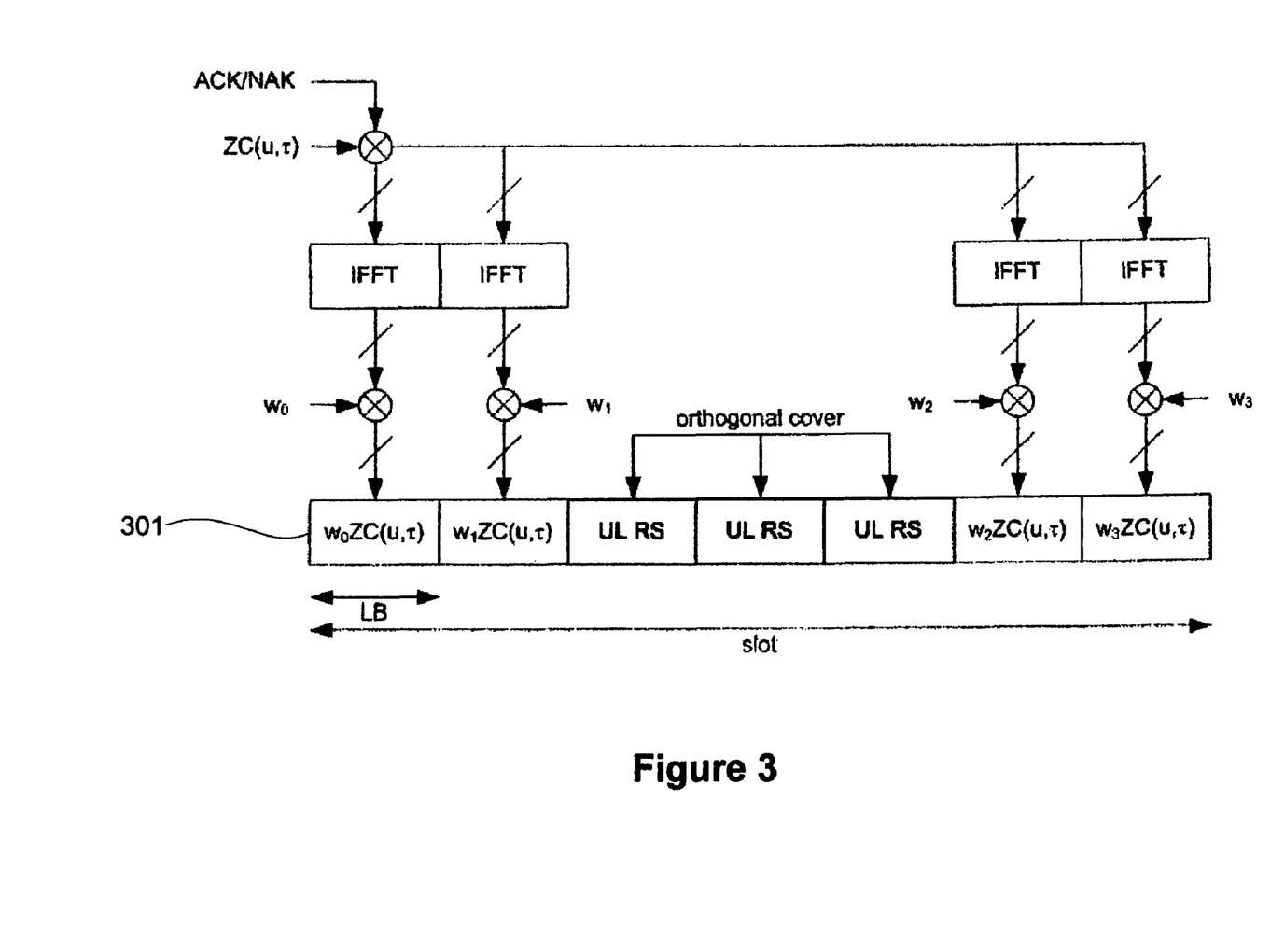
FIG. 3 is a block diagram illustrating the contemporary scenario for the transmission of physical uplink acknowledgement and non-acknowledgement channels and reference signals for acknowledgement and non-acknowledgement demodulation.

FIG. 3, cited from reference [3], shows the contemporary working assumption on the transmission block of uplink ACK/NAK channels and reference signals. Here, the position of the reference signal long block is not determined, therefore, FIG. 3 is only for illustrative purposes. ACK/NAK signals and the uplink reference signals (UL RS) for ACK/NAK demodulation are multiplexed on code channels 301 constructed by both a cyclic shift of a base sequence (e.g., Zadoff-Chu sequence) and an orthogonal cover. ACK/NAK signals and the uplink reference signals are multiplexed on code channels 301 constructed by both of a Zadoff-Chu sequence $ZC(u,\tau)$ and an orthogonal cover. For ACK/NAK channels, a Zadoff-Chu sequence $zc(u,\tau)$ with a particular cyclic shift $\tau$, $ZC(u,\tau)$ is placed in sub-carriers and an orthogonal cover is applied to time domain long block (LB). The IFFTs transform a frequency domain representation of the input sequence to a time domain representation. The orthogonal cover may be used for both of UL RS and for PUCCH data, the actual code of the orthogonal cover is different from $\{w_0, w_1, w_2, w_3\}$ which is used only for PUCCH data.

Here, FIG. 2 shows an example of a contemporary mapping method exclusively adapted to resource blocks only containing CQI channels, and FIG. 3 shows an example of a contemporary mapping method for ACK/ANCK channels.

One important aspect of system design is resource remapping on a symbol, slot or subframe-level. The slot-level resource remapping methods have been proposed in, for example, references [2] and [3], and have been included in the current Change Request to the specification in reference [1]. Section 5.4.1 of reference [1], which includes the slot-level remapping of the ACK/ANCK channel in the uplink control PUCCH channel of LTE, is cited below for ease of exposition.
"5.4.1 PUCCH formats 1, 1a and 1b For PUCCH format 1, information is carried by the presence/absence of transmission of PUCCH from the UE. In the remainder of this section, d(0)=1 shall be assumed for PUCCH format 1.

For PUCCH formats 1a and 1b, one or two explicit bits are transmitted, respectively. The block of bits $b(0), \ldots, b(M_{bit}-1)$ shall be modulated as described in section 7.1, resulting in a complex-valued symbol d(0). The modulation schemes for the different PUCCH formats are given by Table 5.4-1.

The complex-valued symbol d(0) shall be multiplied with a cyclically shifted length $N_{seq}^{PUCCH}=12$ sequence $r_{u,v}^{(\alpha)}(n)$ according to:

$$y(n) = d(0) \cdot r_{u,v}^{(\alpha)}(n), n = 0, 1, \ldots, N_{seq}^{PUCCH}, \quad (1)$$

where $r_{u,v}^{(\alpha)}(n)$ is defined by section 5.5.1 with $M_{sc}^{R} = N_{seq}^{PUCCH}$. The cyclic shift $\alpha$ varies between symbols and slots as defined below.

The block of complex-valued symbols $y(0), \ldots, y(N_{seq}^{PUCCH}-1)$ shall be block-wise spread with the orthogonal sequence $w_{n_{oc}}(i)$ according to $$z(m' \cdot N_{SF}^{PUCCH} \cdot N_{seq}^{PUCCH} + m \cdot N_{seq}^{PUCCH} + n) = w_{n_{oc}}(m) \cdot y(n), \quad (2)$$

where
$m = 0, \ldots, N_{SF}^{PUCCH} - 1$
$n = 0, \ldots, N_{seq}^{PUCCH} - 1$
$m' = 0, 1$ with $N_{SF}^{PUCCH}=4$. The sequence $w_{n_{oc}}(i)$ is given by Table 5.4.1-1.

Resources used for transmission of PUCCH format 1, 1a and 1b are identified by a resource index $n_{PUCCH}^{(1)}$ from which the orthogonal sequence index $n_{oc}(n_s)$ and the cyclic shift $a(n_s)$ are determined according to:

$$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix,} \end{cases} \quad (3)$$

-continued $$\alpha(n_s) = 2\pi \cdot n_{cs}(n_s)/N_{sc}^{RB}, \qquad (4)$$

$$n_{cs}(n_s) = \begin{cases} [n_{cs}^{cell}(n_s, l) + (n'(n_s) \cdot \Delta_{shift}^{PUCCH} + \delta_{offset}^{PUCCH} + (n_{oc}(n_s) \bmod \Delta_{shift}^{PUCCH})) \bmod N'] \bmod N_{sc}^{RB} & \text{for normal cyclic prefix} \\ [n_{cs}^{cell}(n_s, l) + (n'(n_s) \cdot \Delta_{shift}^{PUCCH} + \delta_{offset}^{PUCCH} + n_{oc}(n_s)/2) \bmod N'] \bmod N_{sc}^{RB} & \text{for extended cyclic prefix,} \end{cases} \qquad (5)$$

where $$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases} \qquad (6)$$

$$c = \begin{cases} 3 & \text{normal cyclic prefix} \\ 2 & \text{extended cyclic prefix} \end{cases} \qquad (7)$$

The resource indices within the two resource blocks in the two slots of a subframe to which the PUCCH is mapped are given by $$n'(n_s) = \qquad (8)$$
$$\begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod(c \cdot N_{sc}^{RB}/\Delta_{shift}^{PUCCH}) & \text{otherwise} \end{cases}$$

when $n_s$ mod 2=0; and by $$n'(n_s) = \begin{cases} [3(n'(n_s) + 1)] \bmod(3N_{sc}^{RB}/\Delta_{shift}^{PUCCH} + 1) - 1 & \text{for normal cyclic prefix and } n_{PUCCH}^{(1)} \geq c \cdot N_{cs}^{(1)}/\Delta_{shift}^{PUCCH} \\ n'(n_s) & \text{otherwise} \end{cases} \qquad (9)$$

when $n_s$ mod 2=1
The quantities $$\Delta_{shift}^{PUCCH} \in \begin{cases} \{1, 2, 3\} & \text{for normal cyclic prefix} \\ \{2, 3\} & \text{for extended cyclic prefix} \end{cases} \qquad (10)$$

$$\delta_{offset}^{PUCCH} \in \{0, 1, \ldots, \Delta_{shift}^{PUCCH} - 1\} \qquad (11)$$

are set by higher layers."

In the present invention, novel slot-level remapping methods are proposed to provide a better intra-cell randomization, especially for ACK/NAK resource blocks with extended cyclic prefix, and for normal cyclic prefix cases with mixed recourse block where the ACK/NAK and CQI coexist in a single resource block. Method A and Method B are proposed as below.

Equations (8) and (9) are referred by the present invention.

Figure 4:
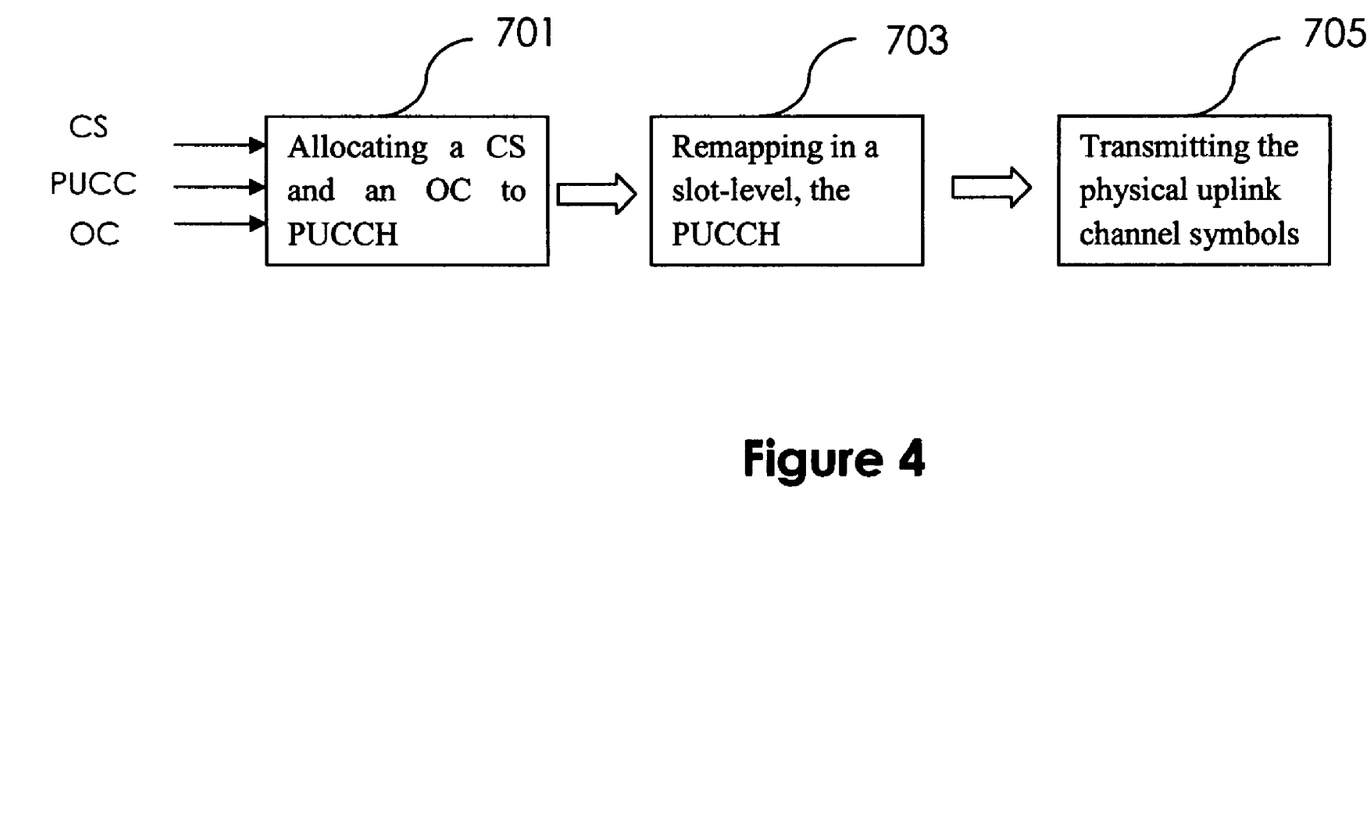
FIG. 4 is a flow chart illustrating a transmitting method of physical uplink channel signals in accordance with the embodiments of the present invention.

FIG. 4 is a flow chart illustrating a transmitting method of physical uplink channel signals in accordance with the embodiments of the present invention. In step 701, signal processing unit_Tx 120 allocates a cyclic shift and an orthogonal cover to physical uplink control channels; in step 703, signal processing unit_Tx 120 maps in a slot-level, the physical uplink control channels into two resource blocks respectively located at two slots of a subframe; and in step 705, the transmitting antennas transmits the mapped physical uplink control channels. The present invention introduces novel remapping methods for performing step 703.

Method A

In one embodiment of the current invention, a slot-level remapping method, method A, is proposed. In this method, the resource indices within the two resource blocks respectively in the two slots of a subframe to which the PUCCH is mapped are given by: when $n_s$ mod 2=0, $$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod(c \cdot N_{sc}^{RB}/\Delta_{shift}^{PUCCH}) & \text{otherwise;} \end{cases} \qquad (12)$$

and when $n_s$ mod 2=1, by $$n'(n_s) = f(n'(n_s - 1)) = \begin{cases} [3(n'(n_s - 1) + 1)] \bmod(3N_{sc}^{RB}/\Delta_{shift}^{PUCCH} + 1) - 1 & \text{for normal cyclic prefix and } n_{PUCCH}^{(1)} \geq c \cdot N_{cs}^{(1)}/\Delta_{shift}^{PUCCH} \\ \lfloor h(n'(n_s - 1))/c \rfloor + [h(n'(n_s - 1)) \bmod c] \cdot (N'/\Delta_{shift}^{PUCCH}) & \text{otherwise,} \end{cases} \qquad (13)$$

where $$h(n'(n_s-1)) = \begin{cases} [2n'(n_s-1)]\mathrm{mod}\left(2\left\lfloor\frac{d}{2}\right\rfloor+1\right) + d \cdot \left\lfloor\frac{n'(n_s-1)}{d}\right\rfloor \cdot (d\,\mathrm{mod}\,2) & \text{for normal cyclic prefix} \\ n'(n_s-1) & \text{for extended cyclic prefix,} \end{cases} \qquad (14)$$

with $d = cN_{cs}^{(1)}/\Delta_{shift}^{PUCCH} - 1$.

Here, $n_s$ is a slot index within a subframe, $n_{PUCCH}^{(1)}$ is a resource index for physical uplink control channel format 1, 1a and 1b, $N_{cs}^{(1)}$ is a number of cyclic shifts used for the physical uplink control channel format 1, 1a and 1b in the resource block, and $N_{sc}^{RB}$ is a resource block size in the frequency domain.

Method B

In another embodiment of the current invention, a slot-level remapping method, method B, is proposed. In this method, the resource indices within the two resource blocks respectively in the two slots of a subframe to which the PUCCH is mapped are given by: when $n_s$ mod 2=0, $$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH})\,\mathrm{mod}\,(c \cdot N_{sc}^{RB}/\Delta_{shift}^{PUCCH}) & \text{otherwise;} \end{cases} \qquad (15)$$

and, when $n_s$ mod 2=1, by $$n'(n_s) = f(n'(n_s-1)) = \lfloor h(n'(n_s-1))/c \rfloor + [h(n'(n_s-1))\mathrm{mod}\,c] \cdot (N'/\Delta_{shift}^{PUCCH}) \qquad (16)$$

where $$h(n'(n_s-1)) = \begin{cases} [2n'(n_s-1)]\mathrm{mod}\left(2\left\lfloor\frac{d}{2}\right\rfloor+1\right) + d \cdot \left\lfloor\frac{n'(n_s-1)}{d}\right\rfloor \cdot (d\,\mathrm{mod}\,2) & \text{for normal cyclic prefix} \\ n'(n_s-1) & \text{for extended cyclic prefix} \end{cases} \qquad (17)$$

with $d = cN_{cs}^{(1)}/\Delta_{shift}^{PUCCH} - 1$.

EXAMPLES OF METHOD A

Six examples for illustrating method A are listed below. As shown in these examples, the proposed method A may be generally adapted to a complex 3GPP LTE physical uplink where ACK/NAK recourse blocks may be applied by the extended cyclic prefix, mixed recourse blocks (where the ACK/NAK and CQI channels coexist) may be applied by the normal cyclic prefix, or mixed recourse blocks (where the ACK/NAK and CQI channels coexist) may be applied by the extended cyclic prefix.

Example One

In the first example, only ACK/NAK channels are carried by the resource block and the extended cyclic prefix is applied.

Here, $\Delta_{shift}^{PUCCH}=2$, N'=12, c=2 and thus n'(0) and n'(1)= f(n'(0)) are achieved as:

| | n'(0) | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| n'(1) = f(n'(0)) | 0 | 6 | 1 | 7 | 2 | 8 | 3 | 9 | 4 | 10 | 5 | 11 |

TABLE 1

Example of CS/OC Sequence Remapping, $\Delta_{shift}^{PUCCH} = 2$, Extended CP

| Cell specific cyclic shift offset | | Slot 0 | | Slot 1 | |
|---|---|---|---|---|---|
| $\delta_{offset}=1$ | $\delta_{offset}=0$ | $OC_{index}=0$ | $OC_{index}=2$ | $OC_{index}=0$ | $OC_{index}=2$ |
| $CS_{index}=1$ | $CS_{index}=0$ | n'(0) = 0 | | n'(1) = f(n'(0)) = 0 | |
| 2 | 1 | | n'(0) = 6 | | 1 |
| 3 | 2 | 1 | | 2 | |
| 4 | 3 | | 7 | | 3 |
| 5 | 4 | 2 | | 4 | |
| 6 | 5 | | 8 | | 5 |
| 7 | 6 | 3 | | 6 | |
| 8 | 7 | | 9 | | 7 |
| 9 | 8 | 4 | | 8 | |
| 10 | 9 | | 10 | | 9 |
| 11 | 10 | 5 | | 10 | |
| | 11 | | 11 | | 11 |

Table 1 shows the example of cyclic shift/orthogonal cover sequence (OS/OC) remapping, where $\Delta_{shift}^{PUCCH}=2$, and an extended cyclic prefix is applied. The resource indices within the two resource blocks respectively in the two slots of a subframe to which the PUCCH is mapped are given by Table 1.

Example Two

In the second example, only ACK/NAK channels are carried by the resource block and the extended cyclic prefix is applied.

Here, $\Delta_{shift}^{PUCCH}=3$, N'=12, c=2 and thus n'(0) and n'(1)=f(n'(0)) are achieved as:

| | n'(0) | | | | | | | |
|---|---|---|---|---|---|---|---|---|
| | 0 | 1 | 2 | 3 | 4 | 5 | 6 | 7 |
| n'(1) = f(n'(0)) | 0 | 4 | 1 | 5 | 2 | 6 | 3 | 7 |

Table 2 shows the example of CS/OC sequence remapping, where $\Delta_{shift}^{PUCCH}=3$ and an extended cyclic prefix is applied. The resource indices within the two resource blocks respectively in the two slots of a subframe are given by Table 2.

Example Three

In the third example, ACK/NAK channels and CQI channels are carried by the resource block and the extended cyclic prefix is applied.

Here, $\Delta_{shift}^{PUCCH}=2$, N'=6, c=2, and thus n'(0) and n'(1)=f(n'(0)) are achieved as:

| | n'(0) | | | | | |
|---|---|---|---|---|---|---|
| | 0 | 1 | 2 | 3 | 4 | 5 |
| n'(1) = f(n'(0)) | 0 | 3 | 1 | 4 | 2 | 5 |

TABLE 2

Example of CS/OC Sequence Remapping, $\Delta_{shift}^{PUCCH} = 3$, Extended CP

| Cell specific cyclic shift offset | | | slot 0 | | slot 1 | |
|---|---|---|---|---|---|---|
| $\delta_{offset}=2$ | $\delta_{offset}=1$ | $\delta_{offset}=0$ | $OC_{index}=0$ | $OC_{index}=2$ | $OC_{index}=0$ | $OC_{index}=2$ |
| $CS_{index}=2$ | $CS_{index}=1$ | $CS_{index}=0$ | n'(0) = 0 | | n'(1) = f(n'(0)) = 0 | |
| 3 | 2 | 1 | | n'(0) = 4 | | 1 |
| 4 | 3 | 2 | | | | |
| 5 | 4 | 3 | 1 | | 2 | |
| 6 | 5 | 4 | | 5 | | 3 |
| 7 | 6 | 5 | | | | |
| 8 | 7 | 6 | 2 | | 4 | |
| 9 | 8 | 7 | | 6 | | 5 |
| 10 | 9 | 8 | | | | |
| 11 | 10 | 9 | 3 | | 6 | |
| 0 | 11 | 10 | | 7 | | 7 |
| 1 | 0 | 11 | | | | |

TABLE 3

Example of CS/OC Sequence Remapping, $\Delta_{shift}^{PUCCH} = 2$, Extended CP

| Cell specific cyclic shift offset | | slot 0 | | slot 1 | |
|---|---|---|---|---|---|
| $\delta_{offset} = 1$ | $\delta_{offset} = 0$ | $OC_{index} = 0$ | $OC_{index} = 2$ | $OC_{index} = 0$ | $OC_{index} = 2$ |
| $CS_{index} = 1$ | $CS_{index} = 0$ | n'(0) = 0 | | n'(1) = f(n'(0)) = 0 | |
| 2 | 1 | | n'(0) = 3 | | 1 |
| 3 | 2 | 1 | | 2 | |
| 4 | 3 | | 4 | | 3 |
| 5 | 4 | 2 | | 4 | |
| 6 | 5 | | 5 | | 5 |
| 7 | 6 | | | | |
| 8 | 7 | CQI | | CQI | |
| 9 | 8 | | | | |
| 10 | 9 | | | | |
| 11 | 10 | | | | |
| 0 | 11 | | | | |

Table 3 shows the example of CS/OC sequence remapping, where $\Delta_{shift}^{PUCCH}=2$ and an extended cyclic prefix is applied. The resource indices within the two resource blocks respectively in the two slots of a subframe to which the PUCCH is mapped are given by Table 3.

Example Four

In the fourth example, ACK/NAK channels and CQI channels are carried by the resource block and the extended cyclic prefix is applied.

Here, $\Delta_{shift}^{PUCCH}=3$, N'=6, c=2, and thus n'(0) and n'(1)=f(n'(0)) are achieved as:

| | n'(0) | | | |
|---|---|---|---|---|
| | 0 | 1 | 2 | 3 |
| n'(1) = f(n'(0)) | 0 | 2 | 1 | 3 |

Table 4 shows the example of CS/OC sequence remapping, where $\Delta_{shift}^{PUCCH}=3$ and an extended cyclic prefix is applied. The resource indices within the two resource blocks respectively in the two slots of a subframe to which the PUCCH is mapped are given by Table 4.

Example Five

In the fifth example, ACK/NAK channels and CQI channels are carried by the resource block and the normal cyclic prefix is applied.

Here, $\Delta_{shift}^{PUCCH}=2$, N'=6, c=3, and thus n'(0) and n'(1)=f(n'(0)) are achieved as:

| | n'(0) | | | | | | | | |
|---|---|---|---|---|---|---|---|---|---|
| | 0 | 1 | 2 | 3 | 4 | 5 | 6 | 7 | 8 |
| n'(1) = f(n'(0)) | 0 | 6 | 4 | 2 | 8 | 3 | 1 | 7 | 5 |

TABLE 4

Example of CS/OC Sequence Remapping, $\Delta_{shift}^{PUCCH} = 3$, Extended CP

| Cell specific cyclic shift offset | | slot 0 | | slot 1 | |
|---|---|---|---|---|---|
| $\delta_{offset} = 1$ | $\delta_{offset} = 0$ | $OC_{index} = 0$ | $OC_{index} = 2$ | $OC_{index} = 0$ | $OC_{index} = 2$ |
| $CS_{index} = 1$ | $CS_{index} = 0$ | n'(0) = 0 | | n'(1) = f(n'(0)) = 0 | |
| 2 | 1 | | n'(0) = 2 | | 1 |
| 3 | 2 | | | | |
| 4 | 3 | 1 | | 2 | |
| 5 | 4 | | 3 | | 3 |
| 6 | 5 | | | | |
| 7 | 6 | CQI | | CQI | |
| 8 | 7 | | | | |
| 9 | 8 | | | | |
| 10 | 9 | | | | |
| 11 | 10 | | | | |
| 0 | 11 | | | | |

TABLE 5

Example of CS/OC Sequence Remapping, $\Delta_{shift}^{PUCCH} = 2$, Normal CP

| Cell specific cyclic shift offset | | slot 0 | | | slot 1 | | |
|---|---|---|---|---|---|---|---|
| $\delta_{offset}=1$ | $\delta_{offset}=0$ | $OC_{index}=0$ | $OC_{index}=1$ | $OC_{index}=2$ | $OC_{index}=0$ | $OC_{index}=1$ | $OC_{index}=2$ |
| $CS_{index}=1$ | $CS_{index}=0$ | n'(0) = 0 | | n'(0) = 6 | n'(1) = f(n'(0)) = 0 | | 1 |
| 2 | 1 | | n'(0) = 3 | | | 5 | |
| 3 | 2 | 1 | | 7 | 6 | | 7 |
| 4 | 3 | | 4 | | | 2 | |
| 5 | 4 | 2 | | 8 | 3 | | 4 |
| 6 | 5 | | 5 | | | 8 | |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

Table 5 shows the example of CS/OC sequence remapping, where $\Delta_{shift}^{PUCCH}=2$ and a normal cyclic prefix is applied. The resource indices within the two resource blocks respectively in the two slots of a subframe to which the PUCCH is mapped are given by Table 5.

Example Five

In the sixth example, ACK/NAK channels and CQI channels are carried by the resource block and the normal cyclic prefix is applied.

Here, $\Delta_{shift}^{PUCCH}=3$, N'=6, c=3, and thus n'(0) and n'(1)=f(n'(0)) are achieve as:

| | n'(0) | | | | | |
|---|---|---|---|---|---|---|
| | 0 | 1 | 2 | 3 | 4 | 5 |
| n'(1) = f(n'(0)) | 0 | 4 | 3 | 2 | 1 | 5 |

Table 6 shows the example of CS/OC sequence remapping, where $\Delta_{shift}^{PUCCH}=3$ and a normal cyclic prefix is applied. The resource indices within the two resource blocks respectively in the two slots of a subframe to which the PUCCH is mapped are given by Table 6.

What is claimed is:

1. A method for a physical uplink transmission, the method comprising the steps of:

allocating, at a transmitter, a cyclic shift and an orthogonal cover to physical uplink control channels;

remapping, at the transmitter, in a slot-level, the physical uplink control channels into two resource blocks respectively located at two slots of a subframe, with:

when $n_s$ mod 2=0, resource indices of the physical uplink control channels within a first slot of the two slots in the two slots of the subframe are established by:

TABLE 6

Example of CS/OC Sequence Remapping, $\Delta_{shift}^{PUCCH} = 3$, Normal CP

| Cell specific cyclic shift offset | | slot 0 | | | slot 1 | | |
|---|---|---|---|---|---|---|---|
| $\delta_{offset}=1$ | $\delta_{offset}=0$ | $OC_{index}=0$ | $OC_{index}=1$ | $OC_{index}=2$ | $OC_{index}=0$ | $OC_{index}=1$ | $OC_{index}=2$ |
| $CS_{index}=1$ | $CS_{index}=0$ | n'(0) = 0 | | n'(0) = 6 | n'(1) = f(n'(0)) = 0 | | 1 |
| 2 | 1 | | n'(0) = 3 | | | 5 | |
| 3 | 2 | 1 | | 7 | 6 | | 7 |
| 4 | 3 | | 4 | | | 2 | |
| 5 | 4 | 2 | | 8 | 3 | | 4 |
| 6 | 5 | | 5 | | | 8 | |
| 7 | 6 | | | | | | |
| 8 | 7 | | CQI | | | CQI | |
| 9 | 8 | | | | | | |
| 10 | 9 | | | | | | |
| 11 | 10 | | | | | | |
| 0 | 11 | | | | | | |

$$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/ \\ \Delta_{shift}^{PUCCH}) \bmod (c \cdot N_{sc}^{RB}/\Delta_{shift}^{PUCCH}) & \text{otherwise,} \end{cases}$$

where $n_s$ is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta_{shift}^{PUCCH} \in \begin{cases} \{1, 2, 3\} & \text{when the cyclic prefix is a normal cyclic prefix} \\ \{2, 3\} & \text{when the cyclic prefix is an extended cyclic prefix} \end{cases}, \text{ and}$$

$$c = \begin{cases} 3 & \text{for the normal cyclic prefix} \\ 2 & \text{for the extended cyclic prefix} \end{cases}; \text{ and}$$

when $n_s \bmod 2=1$, the resource indices of the physical uplink control channels within a second slot of the two slots of the subframe to which the physical uplink channel symbols are remapped by:

$$n'(n_s) = f(n'(n_s - 1)) =$$

$$\begin{cases} [3(n'(n_s - 1) + 1)] \bmod (3N_{sc}^{RB}/ & \text{for normal cyclic} \\ \Delta_{shift}^{PUCCH} + 1) - 1 & \text{prefix and} \\ & n_{PUCCH}^{(1)} \geq c \cdot N_{cs}^{(1)}/\Delta_{shift}^{PUCCH} \\ \lfloor h(n'(n_s - 1))/c \rfloor + & \text{otherwise} \\ [h(n'(n_s - 1)) \bmod c] \cdot (N'/\Delta_{shift}^{PUCCH}) \end{cases}$$

where $$h(n'(n_s - 1)) =$$

$$\begin{cases} [2n'(n_s - 1)] \bmod \left(2\left\lfloor \frac{d}{2} \right\rfloor + 1\right) + & \text{for normal cyclic prefix} \\ d \cdot \left\lfloor \frac{n'(n_s - 1)}{d} \right\rfloor \cdot (d \bmod 2) \\ n'(n_s - 1) & \text{for extended cyclic prefix} \end{cases}$$

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases},$$

and $d = cN_{cs}^{(1)}/\Delta_{shift}^{PUCCH} - 1$; and, transmitting, by transmitting antennas, the remapped physical uplink control channels in the physical uplink.

2. The method of claim 1, with physical uplink control channels being acknowledgement and non-acknowledgement channels and channel quality indication channels.

3. The method of claim 1, with physical uplink control channels being acknowledgement and non-acknowledgement channels.

4. The method of claim 1, wherein the remapped physical uplink control channels include a mapping for resources of more than one user equipment in a same resource block.

5. A method for a physical uplink transmission, the method comprising the steps of:

allocating, at a transmitter, a cyclic shift and an orthogonal cover to physical uplink control channels;

remapping, at the transmitter, in a slot-level, the physical uplink control channels into two resource blocks respectively located at two slots of a subframe, with:

when $n_s \bmod 2=0$, resource indices of the physical uplink control channels within a first slot of the two slots in the two slots of the subframe are established by:

$$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod (c \cdot N_{sc}^{RB}/\Delta_{shift}^{PUCCH}) & \text{otherwise,} \end{cases}$$

where $n_s$ is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta_{shift}^{PUCCH} \in \begin{cases} \{1, 2, 3\} & \text{when the cyclic prefix is a normal cyclic prefix} \\ \{2, 3\} & \text{when the cyclic prefix is an extended cyclic prefix} \end{cases}, \text{ and}$$

$$c = \begin{cases} 3 & \text{for the normal cyclic prefix} \\ 2 & \text{for the extended cyclic prefix} \end{cases}; \text{ and}$$

when $n_s \bmod 2 = 1$, the resource indices of the physical uplink control channels within a second slot of the two slots of the subframe to which the physical uplink channel symbols are remapped by:

$$n'(n_s) = f(n'(n_s - 1)) = \lfloor h(n'(n_s - 1))/c \rfloor + [h(n'(n_s - 1)) \bmod c] \cdot (N'/\Delta_{shift}^{PUCCH}),$$

where $$h(n'(n_s - 1)) = \begin{cases} [2n'(n_s - 1)] \bmod \left(2\left\lfloor \frac{d}{2} \right\rfloor + 1\right) + d \cdot \left\lfloor \frac{n'(n_s - 1)}{d} \right\rfloor \cdot (d \bmod 2) & \text{for normal cyclic prefix} \\ n'(n_s - 1) & \text{for extended cyclic prefix,} \end{cases}$$

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}, \text{ and } d = cN_{cs}^{(1)}/\Delta_{shift}^{PUCCH} - 1; \text{ and}$$

transmitting, by transmitting antennas, the remapped physical uplink control channels in the physical uplink.

6. The method of claim 5, with physical uplink control channels being acknowledgement and non-acknowledgement channels and channel quality indication channels.

7. The method of claim 5, with physical uplink control channels being acknowledgement and non-acknowledgement channels.

8. The method of claim 5, wherein the remapped physical uplink control channels include a mapping for resources of more than one user equipment in a same resource block.

9. A transmitter comprising:

transmitter circuitry configured to allocate a cyclic shift and an orthogonal cover to physical uplink control channels, and remap, in a slot-level, the physical uplink control channels into two resource blocks respectively located at two slots of a subframe, with:

when $n_s \bmod 2 = 0$, resource indices of the physical uplink control channels within a first slot of the two slots in the two slots of the subframe are established by:

$$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases}$$

where ns is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta_{shift}^{PUCCH} \in \begin{cases} \{[1], 2, 3\} & \text{when the cyclic prefix is a normal cyclic prefix} \\ \{2, 3\} & \text{when the cyclic prefix is an extended cyclic prefix} \end{cases}, \text{ and}$$

$$c = \begin{cases} 3 & \text{for the normal cyclic prefix} \\ 2 & \text{for the extended cyclic prefix} \end{cases}; \text{ and}$$

when $n_s \bmod 2 = 1$, the resource indices of the physical uplink control channels within a second slot of the two slots of the subframe to which the physical uplink channel symbols are remapped by:

$$n'(n_s) = f(n'(n_s - 1)) = \begin{cases} [3(n'(n_s - 1) + 1)] \bmod (3N_{sc}^{RB}/\Delta_{shift}^{PUCCH} + 1) - 1 & \text{for normal cyclic prefix and } n_{PUCCH}^{(1)} \geq c \cdot N_{cs}^{(1)}/\Delta_{shift}^{PUCCH} \\ \lfloor h(n'(n_s - 1))/c \rfloor + [h(n'(n_s - 1)) \bmod c] \cdot (N'/\Delta_{shift}^{PUCCH}) & \text{otherwise} \end{cases}$$

where $$h(n'(n_s - 1)) = \begin{cases} [2n'(n_s - 1)] \bmod \left(2\left\lfloor \frac{d}{2} \right\rfloor + 1\right) + d \cdot \left\lfloor \frac{n'(n_s - 1)}{d} \right\rfloor \cdot (d \bmod 2) & \text{for normal cyclic prefix} \\ n'(n_s - 1) & \text{for extended cyclic prefix,} \end{cases}$$

$$N' = \begin{cases} N_{cs}^{(1)} & \text{if } n_{PUCCH}^{(1)} < c \cdot N_{cs}^{(1)} \cdot \Delta_{shift}^{PUCCH} \\ N_{sc}^{RB} & \text{otherwise} \end{cases}, \text{ and } d = cN_{cs}^{(1)}/\Delta_{shift}^{PUCCH} - 1; \text{ and}$$

antennas transmitting the remapped physical uplink control channels in the physical uplink.

10. The transmitter of claim 9, with physical uplink control channels being acknowledgement and non-acknowledgement channels and channel quality indication channels.

11. The transmitter of claim 9, with physical uplink control channels being acknowledgement and non-acknowledgement channels.

12. The transmitter of claim 9, wherein the remapped physical uplink control channels include a mapping for resources of more than one user equipment in a same resource block.

13. A transmitter comprising:

transmitter circuitry configured to allocate a cyclic shift and an orthogonal cover to physical uplink control channels, and remap, in a slot-level, the physical uplink control channels into two resource blocks respectively located at two slots of a subframe, with:

when $n_s$ mod 2=0, resource indices of the physical uplink control channels within a first slot of the two slots in the two slots of the subframe are established by:

$$n'(n_s) = \begin{cases} n^{(1)}_{PUCCH} & \text{if } n^{(1)}_{PUCCH} < c \cdot N^{(1)}_{cs}/\Delta^{PUCCH}_{shift} \\ (n^{(1)}_{PUCCH} - c \cdot N^{(1)}_{cs}/\Delta^{PUCCH}_{shift}) \bmod (c \cdot N^{RB}_{sc}/\Delta^{PUCCH}_{shift}) & \text{otherwise,} \end{cases}$$

where ns is the index of slots within a subframe, $n_{PUCCH}^{(1)}$ is a resource index for physical uplink control channel format 1, 1a and 1b, $N_{cs}^{(1)}$ is the number of cyclic shifts used for the physical uplink control channel format 1, 1a and 1b in the resource block, $N_{sc}^{RB}$ is the size of resource block in the frequency domain, $$\Delta^{PUCCH}_{shift} \in \begin{cases} \{[1], 2, 3\} & \text{when the cyclic prefix is a normal cyclic prefix} \\ \{2, 3\} & \text{when the cyclic prefix is an extended cyclic prefix} \end{cases}, \text{ and}$$

$$c = \begin{cases} 3 & \text{for the normal cyclic prefix} \\ 2 & \text{for the extended cyclic prefix} \end{cases}; \text{ and}$$

when $n_s$ mod 2=1, the resource indices of the physical uplink control channels within a second slot of the two slots of the subframe to which the physical uplink channel symbols are remapped by:

$$n'(n_s) = f(n'(n_s - 1)) = \lfloor h(n'(n_s-1))/c \rfloor + [h(n'(n_s-1)) \bmod c] \cdot (N'/\Delta^{PUCCH}_{shift}),$$

where $$h(n'(n_s-1)) = \begin{cases} [2n'(n_s-1)] \bmod \left(2\left\lfloor\frac{d}{2}\right\rfloor + 1\right) + d \cdot \left\lfloor\frac{n'(n_s-1)}{d}\right\rfloor \cdot (d \bmod 2) & \text{for normal cyclic prefix} \\ n'(n_s-1) & \text{for extended cyclic prefix,} \end{cases}$$

$$N' = \begin{cases} N^{(1)}_{cs} & \text{if } n^{(1)}_{PUCCH} < c \cdot N^{(1)}_{cs}/\Delta^{PUCCH}_{shift} \\ N^{RB}_{sc} & \text{otherwise} \end{cases}, \text{ and } d = cN^{(1)}_{cs}/\Delta^{PUCCH}_{shift} - 1; \text{ and}$$

one or more antennas configured to transmit the remapped physical uplink control channels in the physical uplink.

14. The transmitter of claim 13, with physical uplink control channels being acknowledgement and non-acknowledgement channels and channel quality indication channels.

15. The transmitter of claim 13, with physical uplink control channels being acknowledgement and non-acknowledgement channels.

16. The transmitter of claim 13, wherein the remapped physical uplink control channels include a mapping for resources of more than one user equipment in a same resource block.

\* \* \* \* \*